(12) United States Patent
Shenoy et al.

(10) Patent No.: US 12,682,461 B2
(45) Date of Patent: Jul. 14, 2026

(54) SYSTEM AND METHOD FOR DETECTING AND REDACTING INAPPROPRIATE IMAGES

(71) Applicant: Walmart Apollo, LLC, Bentonville, AR (US)

(72) Inventors: Gireesha Shenoy, Bengaluru (IN); Prateek Hegde, Bengaluru (IN); Sumit Jain, Bengaluru (IN); Dheeraj Kumar, Bengaluru (IN)

(73) Assignee: Walmart Apollo, LLC, Bentonville, AR (US)

( * ) Notice: Subject to any disclaimer, the term of this patent is extended or adjusted under 35 U.S.C. 154(b) by 351 days.

(21) Appl. No.: 18/212,405

(22) Filed: Jun. 21, 2023

(65) Prior Publication Data

US 2024/0428418 A1 Dec. 26, 2024

(51) Int. Cl.
| | |
|---|---|
| *G06T 7/11* | (2017.01) |
| *G06T 7/60* | (2017.01) |
| *G06T 7/73* | (2017.01) |

(52) U.S. Cl.
CPC ................. *G06T 7/11* (2017.01); *G06T 7/60* (2013.01); *G06T 7/74* (2017.01); *G06T 2207/10024* (2013.01); *G06T 2207/20081* (2013.01); *G06T 2207/30196* (2013.01)

(58) Field of Classification Search
CPC ..... G06T 7/11; G06T 7/74; G06T 7/60; G06T 2207/10024; G06T 2207/20081; G06T 2207/30196
See application file for complete search history.

(56) References Cited

U.S. PATENT DOCUMENTS

| | | | | |
|---|---|---|---|---|
| 11,508,087 | B2 * | 11/2022 | Zohar | ..................... G06T 11/60 |
| 11,526,324 | B2 | 12/2022 | Zilka | |
| 11,854,146 | B1 * | 12/2023 | Smith | .................. G06V 20/647 |
| 12,073,527 | B2 * | 8/2024 | Fu | ........................... G06T 17/00 |
| 12,437,367 | B2 * | 10/2025 | Assouline | ............. G06V 10/82 |
| 2011/0135204 | A1 | 6/2011 | Choi | |

OTHER PUBLICATIONS

Ap-Apid, R., "An Algorithm for Nudity Detection," Jan. 2005, [retrieved on Jun. 9, 2023], Retrieved from the Internet: <URL:https://www.researchgate.net/publication/249767252>.

(Continued)

*Primary Examiner* — Gregory M Desire
(74) *Attorney, Agent, or Firm* — DICKINSON WRIGHT RLLP; Hector A. Agdeppa

(57) ABSTRACT

A method can include capturing, via a camera, an image for upload. The method further can include determining a polygon mask layer having one or more polygon masks for a user body in the image, comprising: (a) determining, via a body pose landmarking algorithm, key joint points for the user body based on joint landmarks defined in a configuration set; and (b) determining the polygon masks based on the key joint points and one or more regions of interest defined in the configuration set. The method additionally can include determining a skin mask layer with a skin mask for the image. The method also can include blending the one or more polygon masks and the skin mask into a final mask layer comprising a final mask for the image. The method further can include applying the final mask to the image. Other embodiments are disclosed.

20 Claims, 12 Drawing Sheets

(56) References Cited

OTHER PUBLICATIONS

DeepAI, "Nudity Detection API", [retrieved on Jun. 9, 2023], Retrieved from the Internet: <https://deepai.org/machine-learning-model/nsfw-detector>.

Jaiswal, A., "Virtual Try-On Project," Devpost, Inc. 2023, [retrieved on Jun. 9, 2023], Retrieved from the Internet: <https://devpost.com/software/virtual-try-on-project>.

Google AI Edge Solutions; "Pose landmark detection guide"; Jan. 13, 2025; 6 pages; website https://ai.google.dev/edge/mediapipe/solutions/vision/pose_landmarker accessed Feb. 5, 2026.

* cited by examiner

500

600
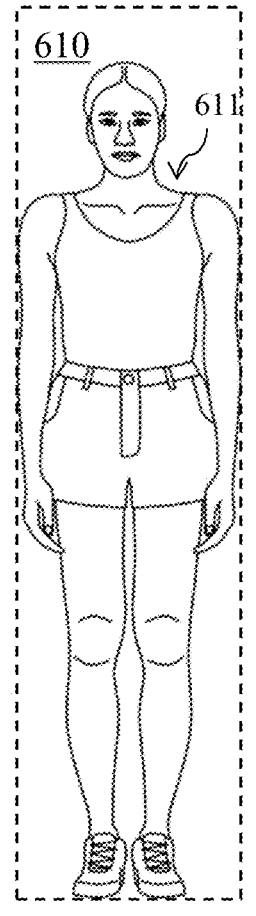
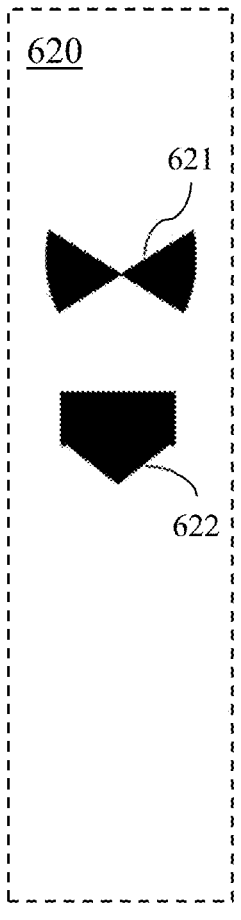
FIG. 6

Figure 9:
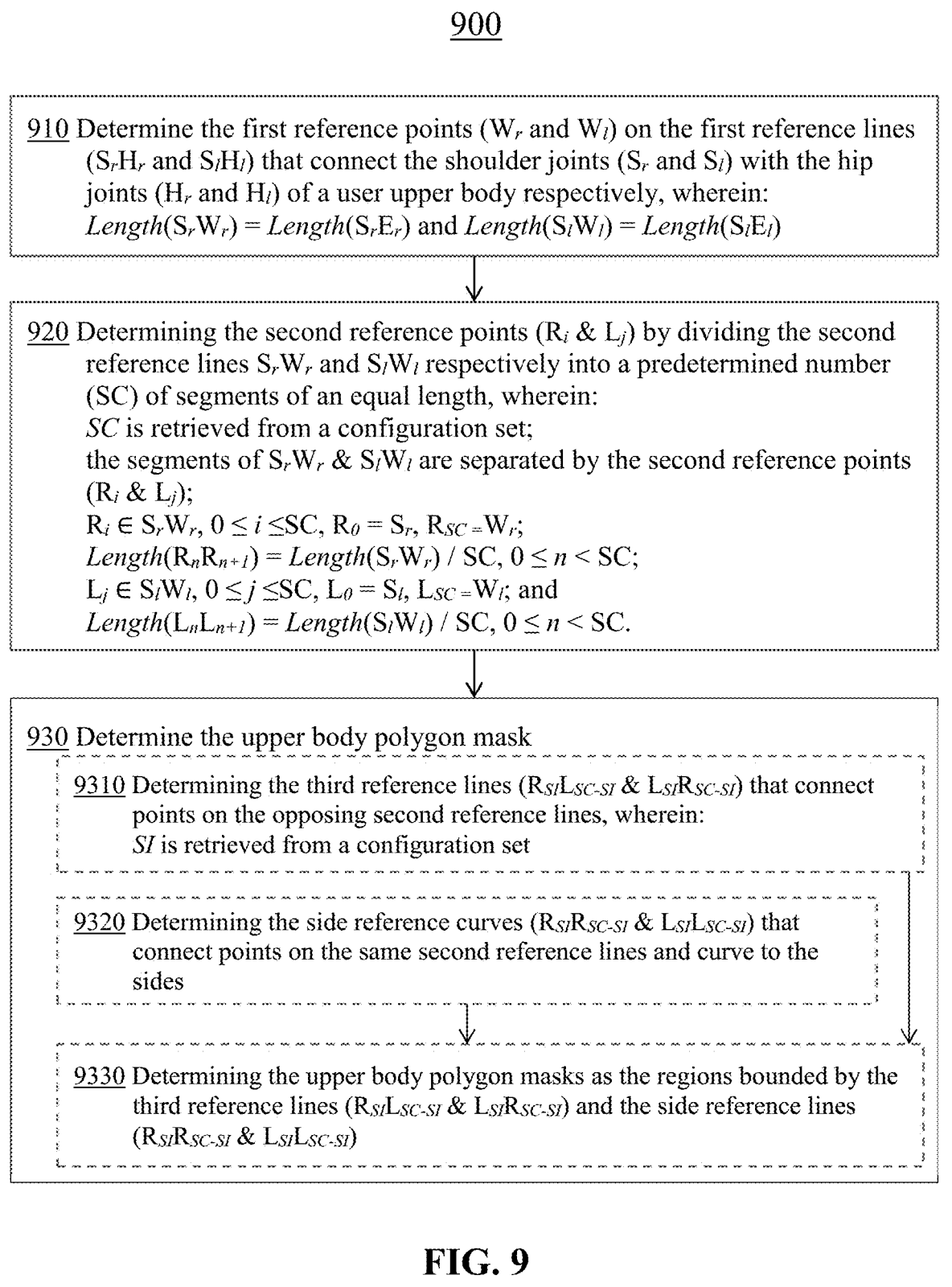

900

910 Determine the first reference points ($W_r$ and $W_l$) on the first reference lines ($S_rH_r$ and $S_lH_l$) that connect the shoulder joints ($S_r$ and $S_l$) with the hip joints ($H_r$ and $H_l$) of a user upper body respectively, wherein:
$Length(S_rW_r) = Length(S_rE_r)$ and $Length(S_lW_l) = Length(S_lE_l)$ 920 Determining the second reference points ($R_i$ & $L_j$) by dividing the second reference lines $S_rW_r$ and $S_lW_l$ respectively into a predetermined number (SC) of segments of an equal length, wherein:
$SC$ is retrieved from a configuration set;
the segments of $S_rW_r$ & $S_lW_l$ are separated by the second reference points ($R_i$ & $L_j$);
$R_i \in S_rW_r$, $0 \leq i \leq SC$, $R_0 = S_r$, $R_{SC} = W_r$;
$Length(R_nR_{n+1}) = Length(S_rW_r) / SC$, $0 \leq n < SC$;
$L_j \in S_lW_l$, $0 \leq j \leq SC$, $L_0 = S_l$, $L_{SC} = W_l$; and
$Length(L_nL_{n+1}) = Length(S_lW_l) / SC$, $0 \leq n < SC$.

930 Determine the upper body polygon mask

9310 Determining the third reference lines ($R_{SI}L_{SC-SI}$ & $L_{SI}R_{SC-SI}$) that connect points on the opposing second reference lines, wherein:
       $SI$ is retrieved from a configuration set 9320 Determining the side reference curves ($R_{SI}R_{SC-SI}$ & $L_{SI}L_{SC-SI}$) that connect points on the same second reference lines and curve to the sides 9330 Determining the upper body polygon masks as the regions bounded by the third reference lines ($R_{SI}L_{SC-SI}$ & $L_{SI}R_{SC-SI}$) and the side reference lines ($R_{SI}R_{SC-SI}$ & $L_{SI}L_{SC-SI}$)

| |
|---|
| <u>1110</u> Determine the first reference lines ($H_rK_r$ and $H_lK_l$) that connect the hip joints ($H_r$ and $H_l$) with the knee joints ($K_r$ and $K_l$) of a user lower body respectively |

$\downarrow$

| |
|---|
| <u>1120</u> Determining the first reference points ($R_i$ & $L_j$) by dividing the first reference lines ($H_rK_r$ & $H_lK_l$) respectively into a predetermined number (SC) of segments of an equal length, wherein: <br> SC is retrieved from a configuration set; <br> the segments of $H_rK_r$ & $H_lK_l$ are separated by the first reference points ($R_i$ & $L_j$); <br> $R_i \in H_rK_r$, $0 \le i \le SC$, $R_0 = H_r$, $R_{SC} = K_r$; <br> $Length(R_nR_{n+1}) = Length(H_rK_r) / SC$, $0 \le n < SC$; <br> $L_j \in H_lK_l$, $0 \le j \le SC$, $L_0 = H_l$, $L_{SC} = K_l$; <br> $Length(K_nL_{n+1}) = Length(H_lK_l) / SC$, $0 \le n < SC$. |

| |
|---|
| <u>1130</u> Determining the second reference points ($M_r$ & $M_l$) |

| |
|---|
| <u>1140</u> Determining the third reference point (O) as the point of intersection of the second reference lines ($R_{SI} M_l$ & $L_{SI} M_r$) |

| |
|---|
| <u>1150</u> Determining the third reference line ($H_rH_l$) that connects the hip joints ($H_r$ & $H_l$) |

| |
|---|
| <u>1160</u> Determine the lower body polygon mask as the region bounded by the segments of the first reference lines ($H_rR_{SI}$ & $H_lL_{SI}$), the segments of the second reference lines ($R_{SI}O$ & $L_{SI}O$), and the third reference line ($H_rH_l$) |

FIG. 11

<u>1200</u>
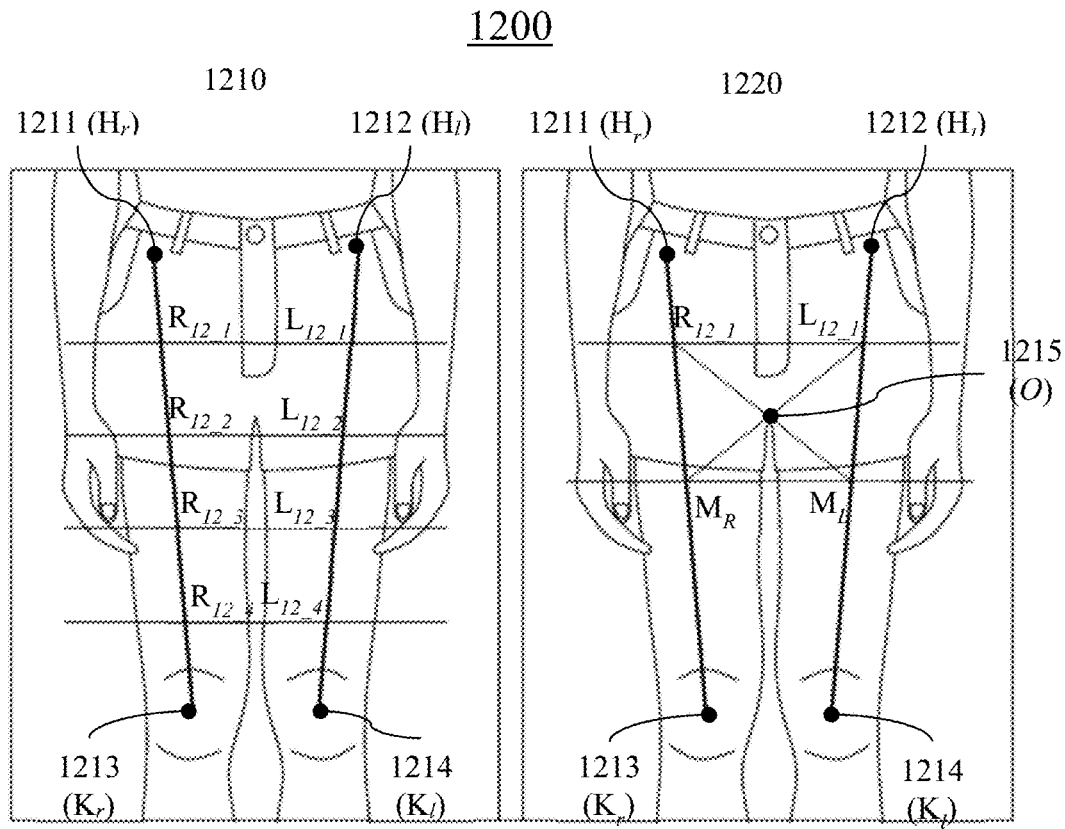
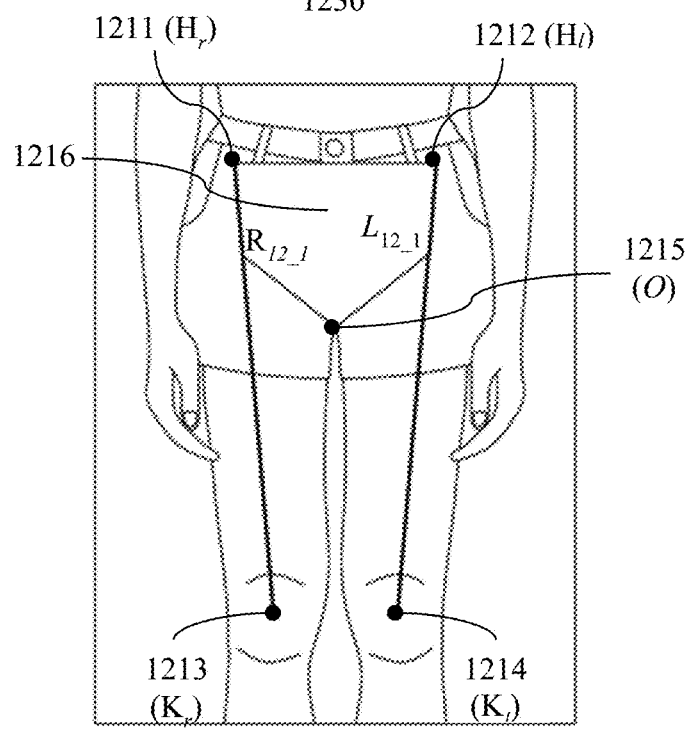
FIG. 12

SYSTEM AND METHOD FOR DETECTING AND REDACTING INAPPROPRIATE IMAGES

TECHNICAL FIELD

This disclosure relates generally to techniques for nudity detection and redaction.

BACKGROUND

Uploading images to remote servers is common for various online applications. For example, a virtual fitting room for online shopping requires full-body images uploaded to be processed. People also love to share personal photographs on social media with friends and family. To protect the users' privacy and to prevent the distribution of inappropriate images, systems and methods for nudity detection and redaction are desired.

BRIEF DESCRIPTION OF THE DRAWINGS

To facilitate further description of the embodiments, the following drawings are provided in which:

FIG. 6 illustrates an image of a human body and mask layers for detecting unwanted or indecent portions of the image, according to an embodiment;

FIG. 9 illustrates a flow chart for a method for generating an upper body polygon mask, according to an embodiment;

FIG. 11 illustrates a flow chart for a method for generating a lower body polygon mask, according to an embodiment; and FIG. 12 illustrates reference lines and reference points determined in the method in FIG. 11 for a human body, according to an embodiment.

Figure 1:
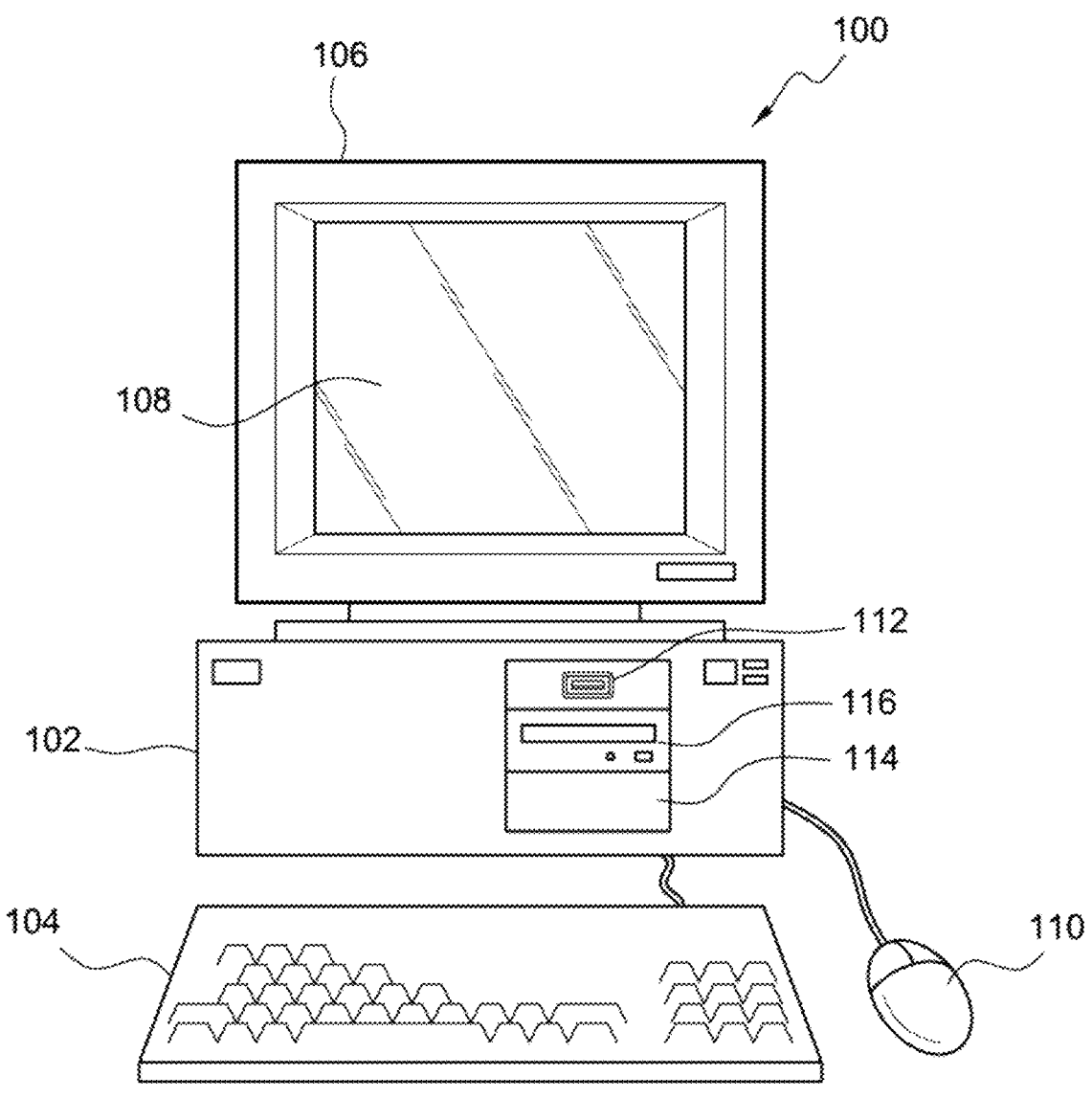
FIG. 1 illustrates a front elevation view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DESCRIPTION OF EXAMPLES OF EMBODIMENTS

Figure 2:
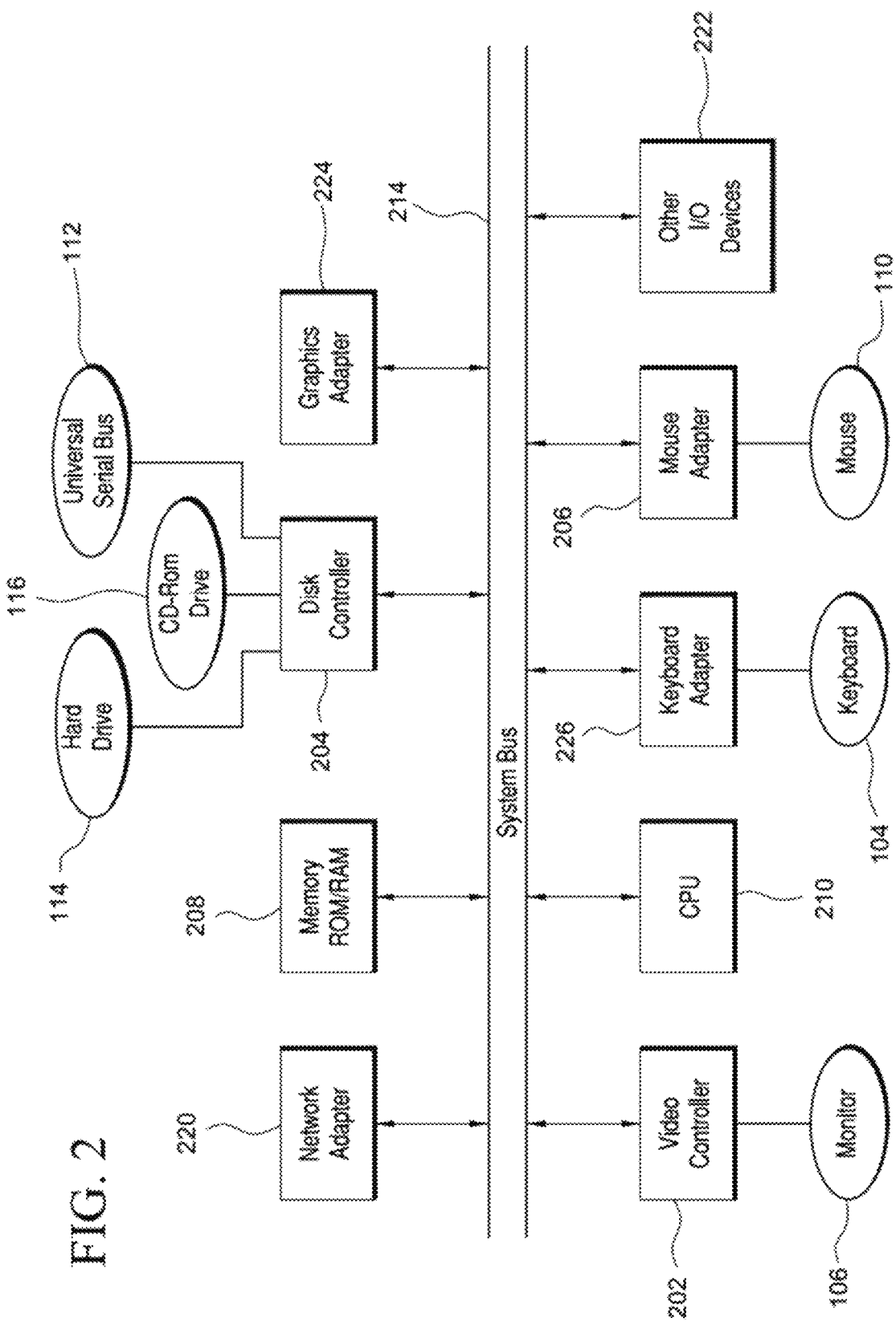
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refers to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii)

the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICS.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such Block as a smartphone. In certain additional embodiments, computer system 100 may comprise an embedded system.

Figure 3:
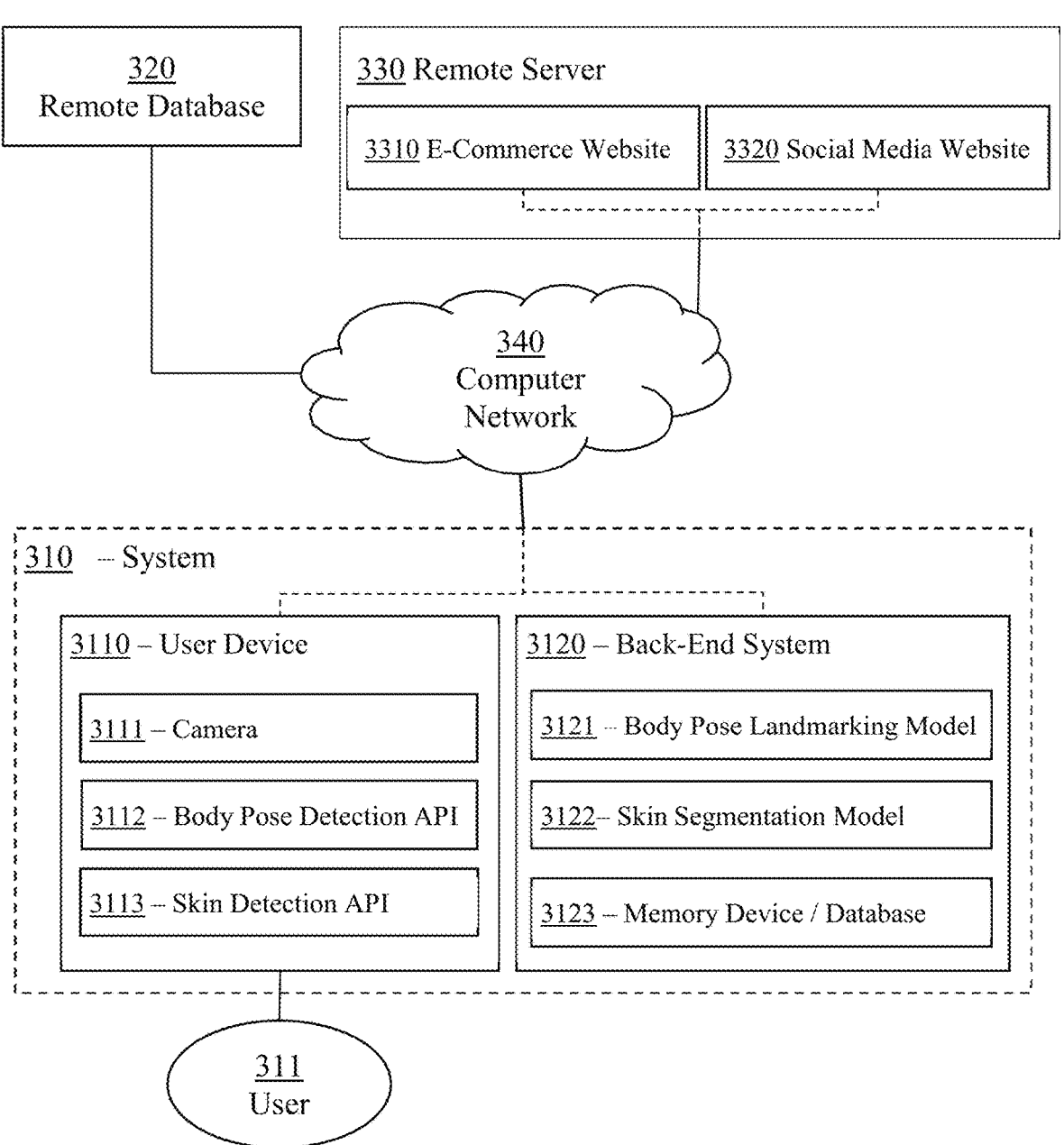
FIG. 3 illustrates a system for detecting nudity in images and redacting the unwanted or indecent portions from the images before upload, according to an embodiment.

Turning ahead in the drawings, FIG. 3 illustrates a block diagram for a system 300, according to an embodiment. In many embodiments, system 300 comprises one or more systems (e.g., a system 310 or a back-end system 3120), one or more databases (e.g., a database 320), one or more remote server (e.g., a remote server 330, an e-commerce website 3310, or a social media website 3320), one or more computer networks (e.g., a computer network 340), and/or one or more user devices (e.g., a user device 3110) for one or more users (e.g., a user 311). In many embodiments, user 311 is not part of system 300. In many embodiments, system 300 or system 310 can prevent images with inappropriate or unwanted contents to be uploaded from a user device (e.g., user device 3110) to a remote memory device or database (e.g., a memory device/database 3123 or remote database 320) or a remote server (e.g., a remote server 330, an e-commerce website 3310, or a social media website 3320).

For example, system 300 or system 310 can be configured to detect nudity or inappropriate portions in an image taken via a camera (e.g., a camera 3111) by the user (e.g., user 311) and redact such image to cover up the nudity or inappropriate portions before the image can be transmitted, via a computer network (e.g., computer network 340), to another user device, memory device, database, or server (e.g., user device 3110, back-end system 3120, memory device/database 3123, remote database 320, remote server 330, e-commerce website 3310, or social media website 3320). In some embodiments, covering up a portion of the image can be permanent or temporary. For example, an image can be partially encrypted to cover or blur the inappropriate portions before being uploaded to a remote database and decrypted with a passcode after being downloaded to a user device.

Systems 300 and 310 are merely exemplary, and embodiments of systems 300 and 310 are not limited to the embodiments presented herein. Systems 300 and 310 can be employed in many different embodiments or examples not specifically depicted or described herein. In many embodiments, systems 300 and 310 can comprise one or more suitable systems, subsystems, servers, modules, elements, and/or models. In some embodiments, system 310 further can include user device 3110 and/or back-end system 3120. In some embodiments, certain elements, modules, devices, or systems of systems 300 and 310 can perform various procedures, processes, and/or activities. In other embodiments, the procedures, processes, and/or activities can be performed by other suitable elements, modules, devices, or systems of systems 300 and 310. Systems 300 and 310 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of systems 300 and 310 described herein.

In many embodiments, system 310, back-end system 3120, remote database 320, remote server 330, e-commerce website 3310, and/or social media website 3320 can each be a computer system, such as computer system 100 (FIG. 1), as described above, and can each be a single computer, a single server, or a cluster or collection of computers or servers, or a cloud of computers or servers. In other embodiments, a single computer system can host system 310, back-end system 3120, remote database 320, remote server 330, e-commerce website 3310, and/or social media website 3320. Additional details regarding system 310, user device 3110, back-end system 3120, remote database 320, remote server 330, e-commerce website 3310, and social media website 3320 are described herein.

In some embodiments, system 310, user device 3110, back-end system 3120, and/or each of their respective elements, modules, and/or models (e.g., a body pose detection API 3112, a skin detection API 3113, a body pose landmarking model 3121 or a skin segmentation model 3122) can be modules of computing instructions (e.g., software modules) stored at non-transitory computer readable media that operate on one or more processors. In some embodiments, system 300 and/or system 310 does not include one or more of user device 3110, camera 3111, body pose detection API 3112, or skin detection API 3113. As an example, one or more of body pose detection API 3112 or skin detection API 3113 can be provided by or with user device 3110, and in other embodiments, one or more of body pose detection API 3112 or skin detection API 3113 can be added to user device 3110 via an app store, where an entity operating or controlling one or more remote database 320, remote server 330, or back-end system 3120 creates and uploads (or otherwise provides) body pose detection API 3112 or skin detection API 3113 to the app store (whether through a single app or more than one app). In these or other embodiments, system 310, user device 3110, back-end system 3120, and/or each of their respective elements, modules, and/or models can be implemented in hardware or combination of hardware and software. In many embodiments, the operator and/or administrator of system 310, user device 3110, and/or back-end system 3120 can manage system 310, user device 3110, back-end system 3120, and/or their respective processor(s) and/or memory storage unit(s) using the respective input device(s) and/or display device(s).

In a number of embodiments, system 310 can include one or more input devices (e.g., one or more keyboards, one or more keypads, one or more pointing devices such as a computer mouse or computer mice, one or more touchscreen displays, a microphone, etc.), and/or can comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 310. In a similar manner, the processors and/or the non-transitory computer-readable media can be local and/or remote to each other.

System 300, system 310, user device 3110, back-end system 3120, database 320, remote server 330, e-commerce website 3310, and/or social media website 3320 can be implemented using any suitable manner of wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, system 310 can be in data communication, through computer network 340, with remote database 320, remote server 330, e-commerce website 3310, and/or social media website 3320. User device 3110 can be in data communication, directly or through computer network 340, with back-end system 3120. Computer network 340 can include one or more of a computer network, a telephone network, the Internet, and/or an internal network not open to the public (e.g., a private network and/or a virtual private network (VPN)), etc.

Meanwhile, in many embodiments, system 310 also can be configured to communicate with one or more databases (e.g., memory device/database 3123, remote database 320, etc.). Examples of the one or more databases can include a cloud storage for backing up and/or sharing photographs, a database for storing configuration sets for configuring the masks, among other information. In some embodiments, for any particular database of the one or more databases (e.g., memory device/database 3123 and/or remote database 320), that particular database can be stored on a single memory storage unit or the contents of that particular database can be spread across multiple ones of the memory storage units storing the one or more databases, depending on the size of the particular database and/or the storage capacity of the memory storage units. Further, the one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, RocksDB, and IBM DB2 Database.

In a number of embodiments, back-end system 3120 can include one or more models (e.g., a body pose landmarking model 3121, a skin segmentation model 3122, etc.) that interface with one or more applications or APIs (an application programming interface, e.g., body pose detection API 3112, skin detection API 3113, etc.) executed on a user device (e.g., user device 3110) for a user (e.g., user 311). The one or more models (e.g., a body pose landmarking model 3121, a skin segmentation model 3122, etc.) can include one or more suitable machine learning algorithms, pre-trained and/or re-trained iteratively based on a first training image dataset stored in memory device/database 3123 or remote database 320, to determine or detect human poses (e.g., standing, sitting, running, forward-facing or not, etc.), pose landmarks (e.g., knee joints, elbow joints, etc.), and/or naked skin regions (e.g., the arms, legs, face, etc.) for a human body in an image. In some of these embodiments, only one of memory device/database 3123 or remote database 320 can part of or used in system 300. In several embodiments, back-end system 3120 can be a hardware and/or software module of a user device 3110 so that images can be processed in a single device without network until the images are ready for upload.

In many embodiments, remote server 330, e-commerce website 3310, and/or social media website 3320 can host one or more websites and/or mobile application servers that receive images uploaded, via a computer network (e.g., computer network 340), from a user device (e.g., user device 3110). Remote server 330, e-commerce website 3310, and/or social media website 3320 can store, transmit, distribute, and/or manage the images received for various uses. For example, e-commerce website 3310 can receive and store an uploaded full-body image from user 311 for its virtual fitting room. When user 311 chooses to virtually try on an apparel (e.g., a dress, a pair of shoes, a blazer, etc.) on e-commerce website 3310, e-commerce website 3310 can be configured to retrieve the full-body image from the profile and transmit, via computer network 340, the full-body image and an image of the apparel to be rendered and/or displayed on user device 3110. In some embodiments, e-commerce website 3310 further can overlay the apparel image on the full-body image before transmitting the result of virtual apparel fitting for display on user device 3110. In different or similar embodiments, user device 3110 can generate the result of virtual apparel fitting. In further examples, social media website 3320 can receive, store, and/or distribute images uploaded from user device 3110 by user 311.

In some embodiments, user device 3110 can be used by one or more users (e.g., user 311) to interface with system 310, back-end system 3120, remote database 320, remote server 330, e-commerce website 3310, and/or social media website 3320. For example, user device 3110 can, via various user interfaces (e.g., webpages or applications, etc.), transmit commands from user 311 to system 310, back-end system 3120, remote database 320, remote server 330, e-commerce website 3310, and/or social media website 3320, and receive responses and/or notices from system 310, back-end system 3120, remote database 320, remote server 330, e-commerce website 3310, and/or social media website 3320. User device 3110 can take, via camera 3111, an image for user 311 and transmit, via computer network 340, the image to remote database 320, remote server 330, e-commerce website 3310, and/or social media website 3320.

In many embodiments, system 310 and/or user device 3110 can be configured to screen and/or process images before transmitting the images to remote database 320, remote server 330, e-commerce website 3310, and/or social media website 3320 in order to prevent the upload or distribution of inappropriate images (e.g., nude pictures, etc.). System 310 and/or user device 3110 can process images by creating one or more masks for detecting and/or covering up the portion(s) of images that is/are potentially inappropriate or unwanted. In a number of embodiments, system 310 and/or user device 3110 can create the one or more masks in real-time. The one or more masks can include one or more polygon masks that comprise regions of interest on a human body (e.g., breasts, genitals, buttocks, or any parts of a body that are deemed sexual), a skin mask that comprises naked skin areas, and so forth. In some embodiments, system 310 and/or user device 3110 further can retrieve one of configuration sets from a memory device or database (e.g., memory device/database 3123, remote database 320, etc.) and process the images accordingly. In certain embodiments, a configuration set can include one or more formulas or algorithms (e.g., geometric formulas, line segment formulas for reference lines, curve segment formulas for reference curves, etc.) and/or parameters (e.g., pertinent joint landmarks for a human body, reference points, a count of segments for a reference line, etc.) for determining the one or more body polygon masks.

In certain embodiments, system 310 and/or user device 3110 can be desktop computers, laptop computers, mobile devices, and/or other endpoint devices used by one or more users (e.g., user 311). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

Figure 4:
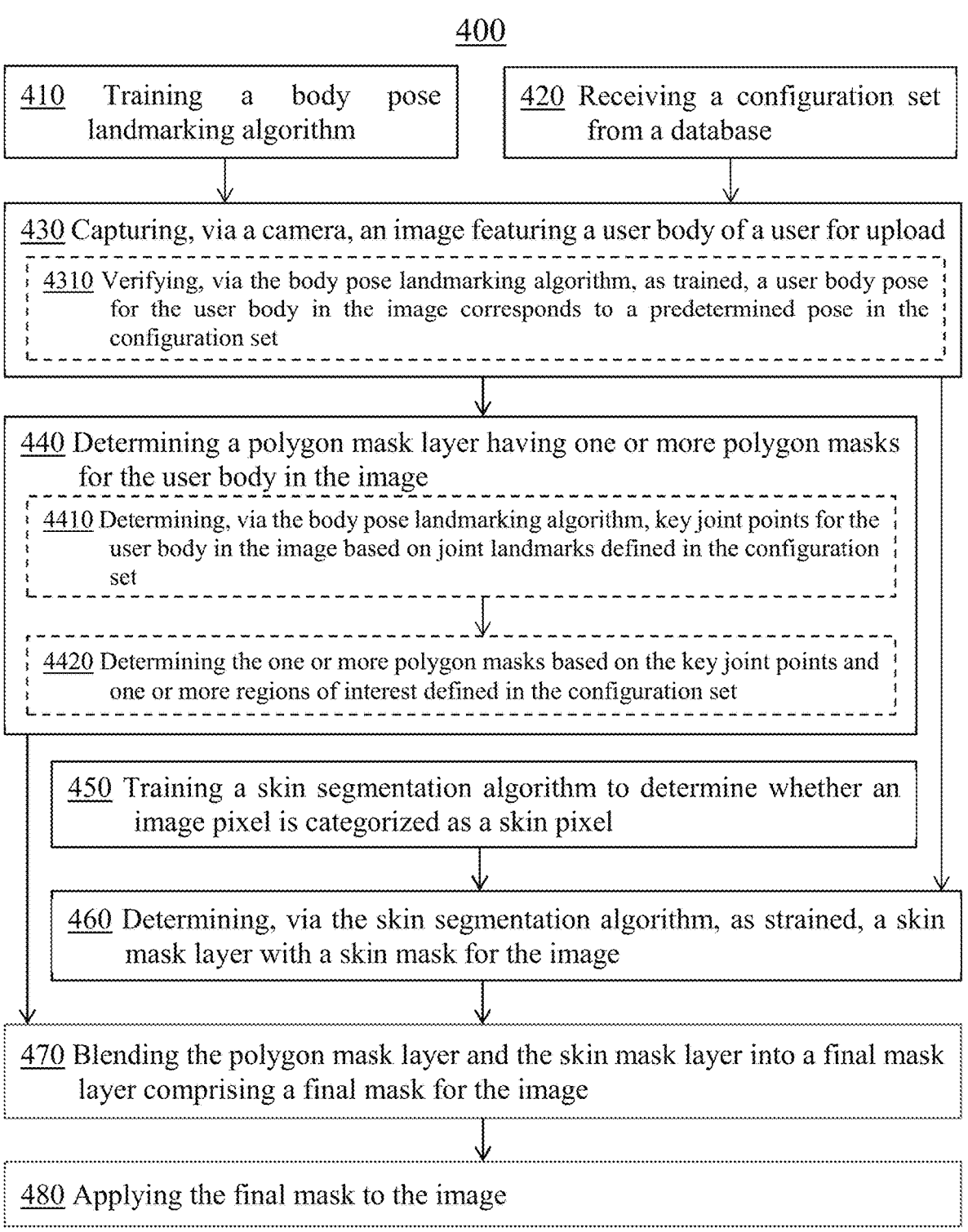
FIG. 4 illustrates a flow chart for a method for detecting nudity in images and redacting the unwanted or indecent portions from the images before upload, according to an embodiment.

Turning ahead in the drawings, FIG. 4 illustrates a flow chart for a method 400 for detecting nudity in an image and redacting the unwanted or inappropriate portion(s) from the image before upload, according to an embodiment. In many embodiments, method 400 can be implemented via execution of computing instructions on one or more processors. Method 400 is merely exemplary and is not limited to the embodiments presented herein. Method 400 can be employed in many different embodiments or examples not specifically depicted or described herein. In some embodiments, the procedures, the processes, the activities, and/or the blocks of method 400 can be performed in the order presented. In other embodiments, the procedures, the processes, the activities, and/or the blocks of method 400 can be performed in any suitable order. In still other embodiments, one or more of the procedures, the processes, the activities, and/or the blocks of method 400 can be combined or skipped.

In many embodiments, system 300 (FIG. 3), system 310 (FIG. 3), user device 3110 (FIG. 3), and/or back-end system 3120 (FIG. 3), can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as system 300 (FIG. 3), system 310 (FIG. 3), user device 3110 (FIG. 3), and/or back-end system 3120 (FIG. 3). The processor(s) can be similar or identical to the processor(s) described above with respect to computer system 100 (FIG. 1).

In many embodiments, method 400 can include training a body pose landmarking algorithm (block 410). The body pose landmarking algorithm can include any suitable machine learning algorithms and be implemented via any suitable frameworks.

Examples of the body pose landmarking algorithm can include neural networks, tree ensembles, support vector machines, generalized linear models, etc. The body pose landmarking algorithm can be implemented by system 300 (FIG. 3), system 310 (FIG. 3), user device 3110 (FIG. 3), body pose detection API 3112 (FIG. 3), back-end system 3120 (FIG. 3), and/or body pose landmarking model 3121 (FIG. 3), via Core ML framework by Apple Inc. of Cupertino, California, United States of America, ML Kit framework by Google of Mountain View, California, United States of America, OpenPose framework by Carnegie Mellon University of Pittsburgh, Pennsylvania, United States of America, etc.

In a number of embodiments, block 410 can include training the body pose landmarking algorithm at body pose landmarking model 3121 (FIG. 3) to determine body landmarks for a human body based on a first training image dataset that includes body poses shown in selected images as training input data and respective body landmarks for each of the body poses as training output data. Exemplary body landmarks for a body can include the eyes, ears, nose, joints (e.g., the neck joint, the shoulder joints, the hip joints, the wrist joints, etc.), and so forth. The first training image dataset can be retrieved from a database (e.g., memory device/database 3123 (FIG. 3)). In many embodiments, block 410 can be performed iteratively with the first training image dataset updated automatically or manually. In certain embodiments, the body pose landmarking algorithm in method 400 can be pre-trained, and block 410 can be performed only once or skipped.

In some embodiments, method 400 further can include receiving a configuration set from a database (block 420). For example, the database for storing configuration sets can include memory storage unit 208 (FIG. 2), memory device/database 3123 (FIG. 3) and/or remote database 320 (FIG. 3). An exemplary configuration set can include one or more formulas and/or parameters for determining one or more body polygon masks for a body featured in an image. It is advantageous to use different configuration sets to adapt to different applications of method 400. For example, the configuration set used for determining body polygon masks can be selected in block 420 in order to adjust the standard of nudity and/or cover different regions of a body based on the settings by the user and/or the cultures of the county or area where the user (e.g., user 311 (FIG. 3)) is located.

In a few embodiments, the configuration set can include one or more geometric formulas configured to define the region(s) of interest (e.g., breasts, thighs, buttocks, genitals, etc.). The geometric formulas can be associated with body landmarks (e.g., joint landmarks) and one or more reference points also defined in the configuration set (e.g., the midpoint between the right shoulder joint and the right elbow). In several embodiments, the one or more geometric formulas can include (a) one or more line segment formulas associated with one or more first pairs of the joint landmarks and the one or more reference points; and/or (b) one or more curve segment formulas associated with one or more second pairs of the joint landmarks and the one or more reference points.

In a number of embodiments, method 400 further can include capturing, via a camera (e.g., camera 3111 (FIG. 3)), an image featuring a user body of a user (e.g., user 311 (FIG. 3)) for upload (block 430). Once the image for upload is taken, block 430 further can include verifying, via the body pose landmarking algorithm, as trained in block 410, that a user body pose for the user body in the image corresponds to a predetermined pose in the configuration set (block 4310). In certain embodiments, block 430 can verify the user body pose when the matching between the user body pose and the predetermined pose is above a predetermined threshold. The pose comparison can be performed by any suitable pose detection APIs (e.g., body pose detection API 3112 (FIG. 3), pose detection APIs under the Vision framework, ML Kit framework, OpenPose framework, etc.), and the threshold can be any suitable percentage (e.g., 75%, 80%, etc.). In embodiments where the image taken by the user is to be uploaded to an online retailer website (e.g., e-commerce website 3310 (FIG. 3)) for the user to virtually try an apparel, the configuration set retrieved in block 420 can include the predetermined pose (e.g., a standard anatomical position, a forward-facing standing position with arms placed at the sides, etc.) for the apparel. In certain embodiments, block 430 also can include pre-processing the image, such as automatic white balance, color correction, noise removal, etc.

In many embodiments, method 400 additionally can include determining a polygon mask layer having one or more polygon masks for the user body in the image taken in block 430 (block 440). Block 430 can be performed in real-time. Examples of the one or more polygon masks can include a single polygon mask (e.g., a mask for covering the torso), an upper body polygon mask and a lower body polygon mask (e.g., bikini-like masks), etc. In some embodiments, block 440 further can include determining, via the body pose landmarking algorithm, as trained in block 410, key joint points for the user body in the image based on joint landmarks defined in the configuration set (block 4410). For example, the body pose landmarking algorithm in block 440 can include for a user device (e.g., user device 3110 (FIG. 3)) to use a body pose detection API (e.g., body pose detection API 3112 (FIG. 3), body pose detection APIs of the Vision framework by Apple Inc. of Cupertino, California, United States of America or the ML Kit framework by Google of Mountain View, California, United States of America, etc.) to interface with a body pose landmarking model (e.g., body pose landmarking model 3121 (FIG. 3)) to have the key joint landmarks (e.g., the shoulders, elbows, hips, knees, etc.) for the user body determined by the body pose landmarking model.

Once the key joint points for the user body are determined, block 440 also can include determining the one or more polygon masks based on the key joint points, as determined in block 4410, and one or more regions of interest defined in the configuration set (block 4420). Block 4420 can be performed in real-time. In several embodiments, the polygon mask layer, as determined in block 440, can include a respective binary value for each pixel for the image, and the pixels to be covered by the polygon mask(s) of the polygon mask layer can correspond to a binary value of 1 in the polygon mask layer, and the pixels outside of the polygon mask(s) can correspond to a binary value of 0 in the polygon mask layer, or vice versa.

In a number of embodiments, method 400 further can include training a skin segmentation algorithm to determine whether an image pixel can be categorized as a skin pixel based on the color of the image pixel (block 450). For example, the skin segmentation algorithm can be trained based on a second training image dataset comprising pixels that are known to be human-skin pixels and non-human-skin pixels. The second training image dataset can be retrieved from a database (e.g., memory device/database 3123 (FIG. 3)). The skin segmentation algorithm can include any suitable machine learning algorithms (e.g., a convolutional neural network (CNN) model, a ResNet model, a Decision Tree (DT) model, a Support Vector Machine (SVM) model, a K-Nearest Neighbor (KNN) classifier, a combined CNN/ Transformer model, a Bilateral Network with Guided Aggregation for Real-Time Semantic Segmentation (BiSeNet V2) model, etc.). The skin segmentation algorithm further can be implemented by system 300 (FIG. 3), system 310 (FIG. 3), user device 3110 (FIG. 3), skin detection API 3113 (FIG. 3), back-end system 3120 (FIG. 3), and/or skin segmentation model 3122 (FIG. 3). In many embodiments, block 450 can be performed iteratively with the second training image dataset updated automatically or manually. In certain embodiments, the skin segmentation algorithm in method 400 can be pre-trained, and block 450 can be performed only once or skipped.

In many embodiments, method 400 further can include determining, via the skin segmentation algorithm, as trained in block 450, a skin mask layer with a skin mask for the image (block 460). Block 460 can determine the skin mask layer in real-time. For example, the skin segmentation algorithm in block 460 can include for a user device (e.g., user device 3110 (FIG. 3)) to use a skin detection API (e.g., skin detection API 3113 (FIG. 3)) to interface, in real-time, with a skin segmentation model (e.g., skin segmentation model 3122 (FIG. 3)) to have pixels of the image for the user body categorized as human-skin pixels or not by the skin segmentation model. After categorizing each pixel into human-skin or non-human-skin, block 460 can determine the respective value for each pixel of the image in the skin mask layer.

In a number of embodiments, the skin mask layer, as determined in block 460, can include a respective binary value for each pixel for the image, and the pixels to be categorized as human-skin pixels can correspond to a binary value of 1 in the skin mask, and the pixels to be categorized as human-skin pixels can correspond to a binary value of 0 in the skin mask, or vice versa.

In some embodiments, method 400 further can include blending the polygon mask layer and the skin mask layer into a final mask layer comprising a final mask for the image (block 470). Block 470 can be performed in real-time. Further, block 470 can include blending the polygon mask layer and the skin mask layer into the final mask layer pixel by pixel. For example, in embodiments where the polygon mask layer and the skin mask layer include binary values corresponding to the pixels of the image, block 470 can blend, in real-time, the polygon mask layer and the skin mask layer by performing a bitwise operation (e.g., AND) on the polygon mask layer and the skin mask layer into the final mask layer.

In many embodiments, method 400 further can include applying the final mask to the image (block 480). Block 480 can apply the final mask by overlaying the final mask layer onto the image to cover a portion of the user body in the image by the final mask. In a few embodiments, block 480 can apply the final mask by applying a mask style (e.g., a color, a pattern, a blurring effect, etc.) to the final mask; and overlaying the final mask layer, with the mask style applied to the final mask, onto the image. Block 480 can apply the final mask to the image in real-time. For example, when the mask style includes the color black, overlaying the final mask layer onto the image can include replacing, in real-time, the pixels of the image overlaid by the final mask to black pixels.

As part of block 480 or after block 480, method 400 also can include using the image, as masked by the final mask, to virtually try on different clothing options by sequentially placing one or more clothing images over the image, as masked by the final mask. This way, when the image is of a user, the user can see what the clothing might look like on the user before the user purchases the clothing, which (in turn) can help to reduce the likelihood that the user will not like the clothing after purchasing the clothing, physically wearing the clothing, and wanting to return the clothing to the e-retailer. This reduced return rate can reduce costs for e-retailers by reducing the need to repackage and restock the returned clothing for a different customer to purchase, and can further reduce costs for the e-retailers who offer free shipping for returns.

Figure 5:
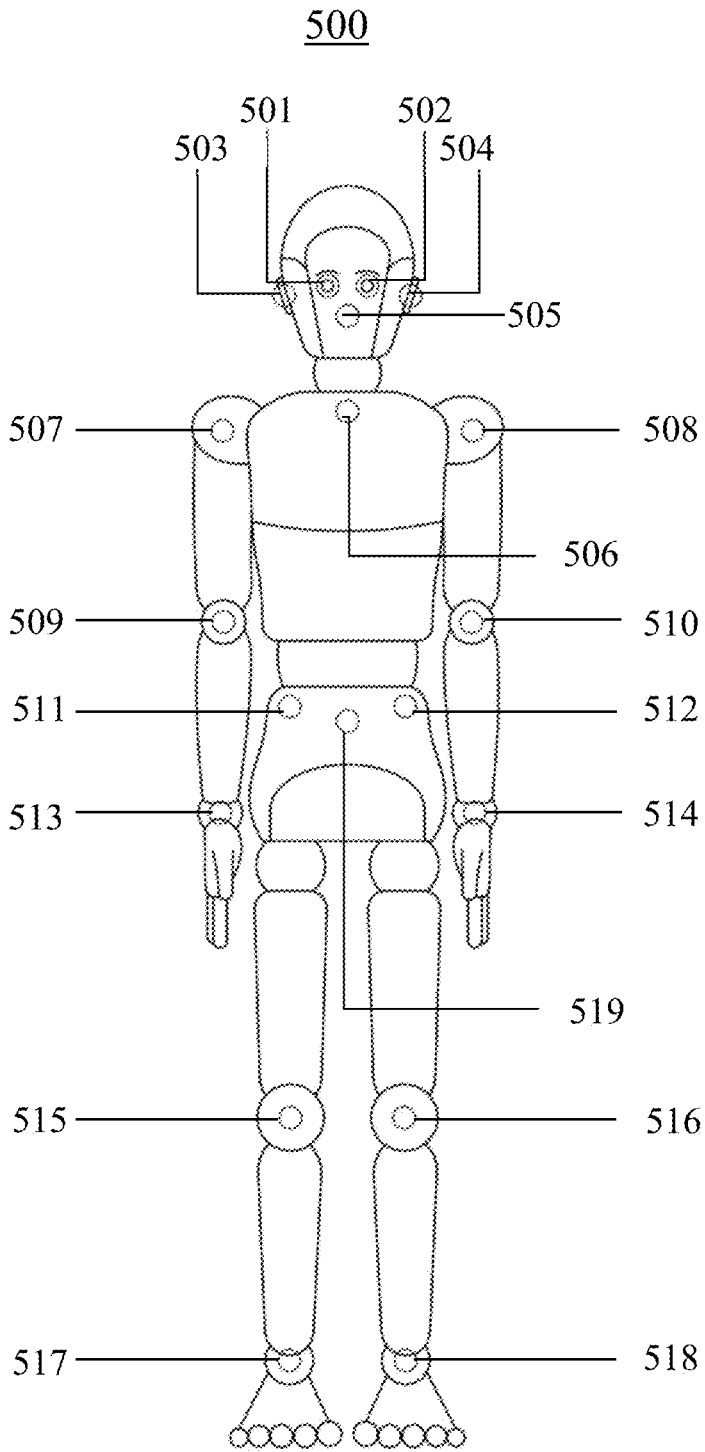
FIG. 5 illustrates pose landmarks for a human body, according to an embodiment.

Turning ahead in the drawings, FIG. 5 illustrates pose landmarks for a human body 500, according to an embodiment. The pose landmarks in FIG. 5 can include eyes 501 and 502, ears 503 and 504, a nose 505, a neck joint 506, shoulder joints 507 and 508, elbow joints 509 and 510, hip joints 511 and 512, wrist joints 513 and 514, knee joints 515 and 516, ankle joints 517 and 518, and a root 519. The pose landmarks are merely exemplary and not limited to the embodiments presented herein.

In many embodiments, system 300 (FIG. 3), system 310 (FIG. 3), user device 3110 (FIG. 3), and/or back-end system 3120 (FIG. 3), can be suitable to determine some or all of the pose landmarks in FIG. 5. In various embodiments, a body pose landmarking algorithm for determining joint landmarks (e.g., the body pose landmarking algorithm implemented by body pose detection API 3112 (FIG. 3) and body pose landmarking model 3121 (FIG. 3), the body pose landmarking algorithm in blocks 410 and 4410 (FIG. 4), etc.) can be trained to determine some or all of the pose landmarks in FIG. 5 and/or additional pose landmarks not shown in FIG. 5.

Turning ahead in the drawings, FIG. 6 illustrates an image 610, a polygon mask layer 620, and a skin mask layer 630 for detecting inappropriate portions of the image 610, according to an embodiment. The image 610 can include a human body 611. The polygon mask layer 620 can include an upper body polygon mask 621 and a lower body polygon mask 622 in color black. The skin mask layer 630 can include a skin mask 631 with multiple skin segments shown in color black the portions of the human body 611 not covered by clothing or shoes. The image 610, the polygon mask layer 620, and the skin mask layer 630 are merely exemplary.

In many embodiments, system 300 (FIG. 3), system 310 (FIG. 3), user device 3110 (FIG. 3), back-end system 3120 (FIG. 3), and/or method 400, can be suitable to take the image 610 and/or determine the polygon mask layer 620 and the skin mask layer 630. In a number of embodiments, block 430 (FIG. 4) can be performed to take the image 610, block 440 (FIG. 4) can be performed to determine the polygon mask layer 620, and/or block 460 (FIG. 4) can be performed to determine the skin mask layer 630.

Figure 7:
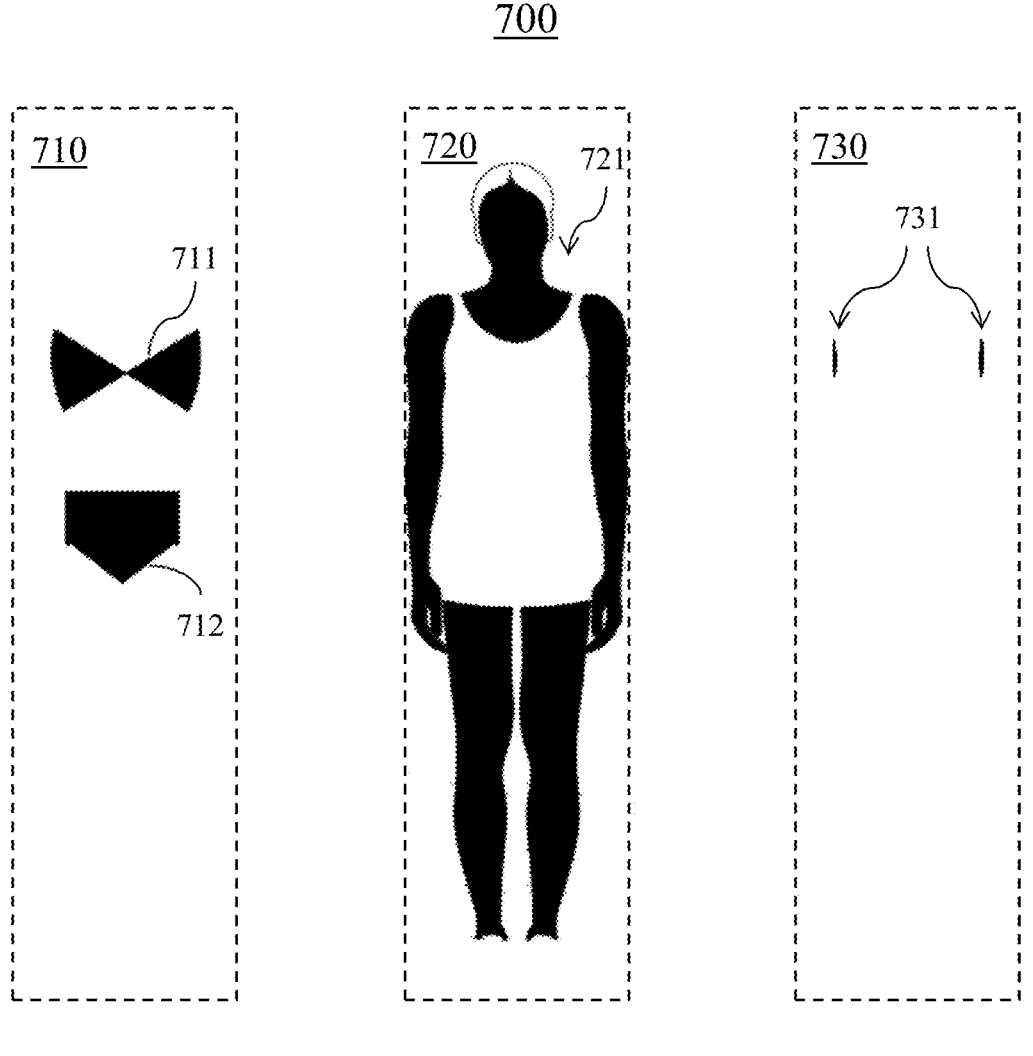
FIG. 7 illustrates a polygon mask layer, a skin mask layer, and a final mask layer generated by blending the polygon mask layer and the skin mask layer, according to an embodiment.

Turning ahead in the drawings, FIG. 7 illustrates a polygon mask layer 710, a skin mask layer 720, and a final mask layer 730 generated by blending the polygon mask layer 710, and the skin mask layer 720. The polygon mask layer 710 can be similar to the polygon mask layer 620 and can include an upper body polygon mask 711 and a lower body polygon mask 712 in color black. The skin mask layer 720 can be similar to the skin mask layer 630 and can include a skin mask 721 with multiple skin segments in color black. The polygon mask layer 710, the skin mask layer 720, and the final mask layer 730 are merely exemplary. In some embodiments, the polygon mask layer 710 the skin mask layer 720 each can include binary values (e.g., each black pixel having a value of 1 and each white pixel having a value of 0), and blending the polygon mask layer 710 and the skin mask layer 720 can include performing a bitwise operation AND on the polygon mask layer 710 the skin mask layer 720.

In many embodiments, system 300 (FIG. 3), system 310 (FIG. 3), user device 3110 (FIG. 3), back-end system 3120 (FIG. 3), and/or method 400, can be suitable to determine the polygon mask layer 710 and the skin mask layer 720 and blend the polygon mask layer 710 and the skin mask layer 720 into the final mask layer 730 with a final mask 731. In a number of embodiments, block 440 (FIG. 4) can be performed to determine the polygon mask layer 710, block 460 (FIG. 4) can be performed to determine the skin mask layer 720, and/or block 470 (FIG. 4) can be performed to blend the polygon mask layer 710 and the skin mask layer 720 into the final mask layer 730.

Figure 8:
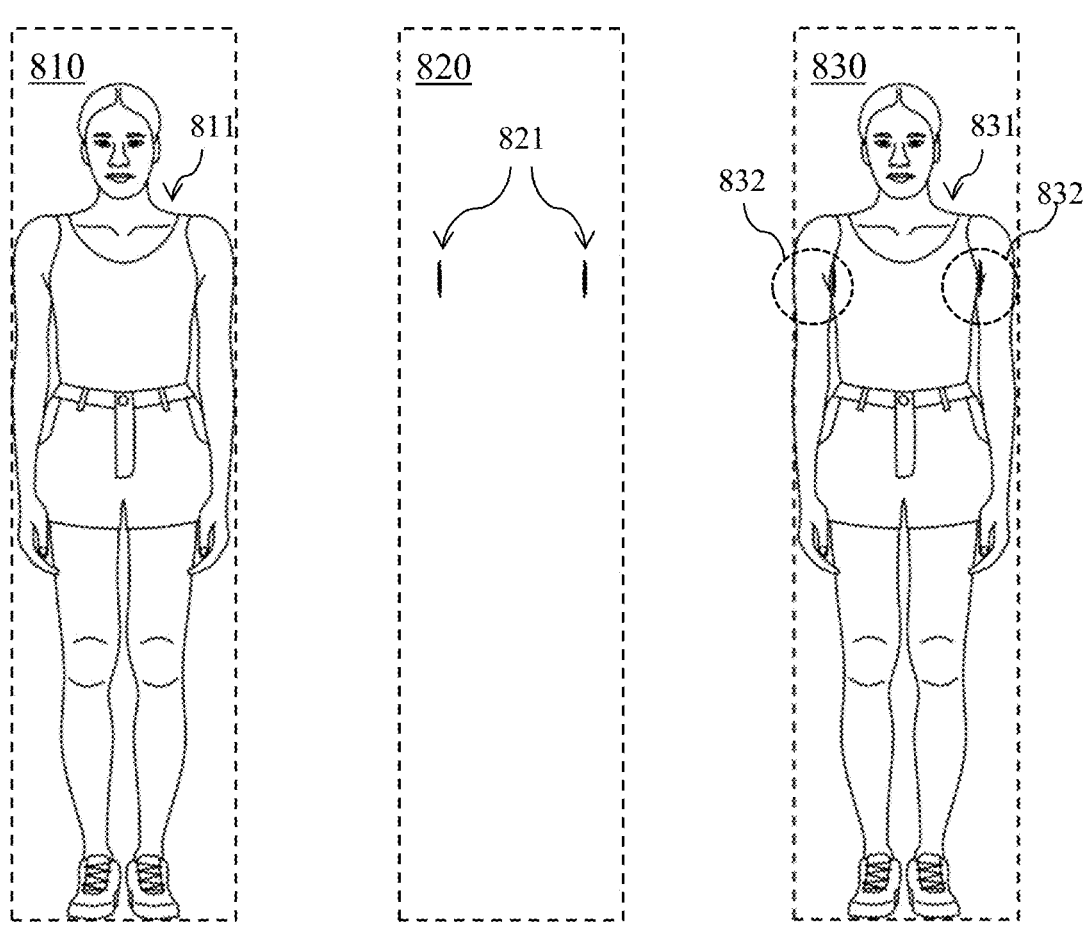
FIG. 8 illustrates an image of a human body, a final mask layer with the final mask for redacting the unwanted or indecent portions of the image, and the image redacted by applying the final mask, according to an embodiment.

Turning ahead in the drawings, FIG. 8 illustrates an image 810 featuring a human body 811, a final mask layer 820 comprising a final mask 821, and an image 830 showing the result of applying the final mask 821 to the image 810, according to an embodiment. Circles 832 are designed to point to the portion of the image 830 where the final mask 821 overlays on the human body 831. The image 810, the final mask layer 820, and the image 830 showing the result of applying the final mask 821 to the image 810 are merely exemplary. In many embodiments, system 300 (FIG. 3), system 310 (FIG. 3), user device 3110 (FIG. 3), back-end system 3120 (FIG. 3), and/or method 400, can be suitable to take the image 810, determine the final mask layer 820, and/or apply the final mask 821 to the image 810 to determine the image 830. In a number of embodiments, block 430 (FIG. 4) can be performed to take the image 810, blocks 440, 460, and 470 (FIG. 4) can be performed to determine the final mask layer 820, and/or block 480 (FIG. 4) can be performed to determine the image 830.

Figure 10:
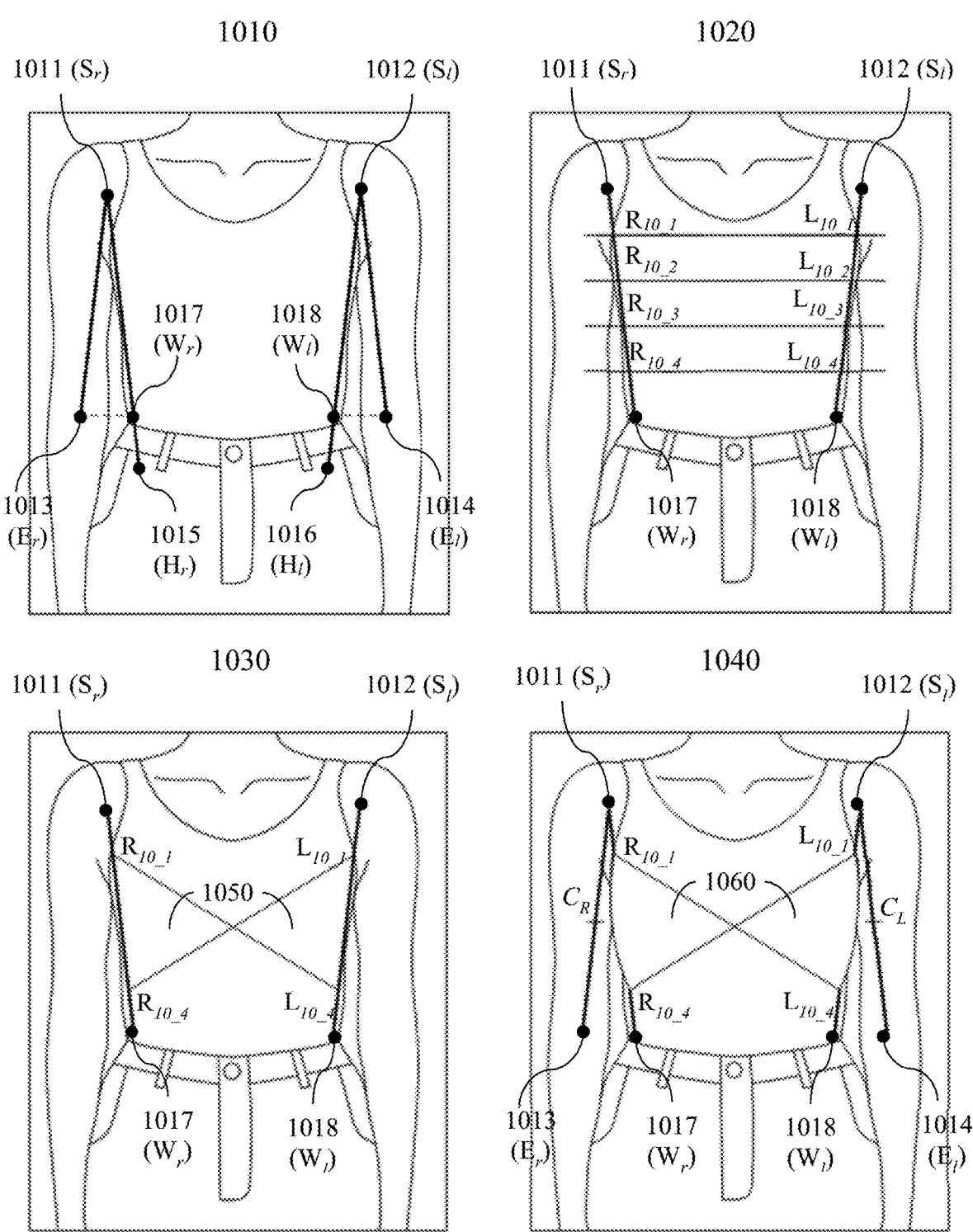
FIG. 10 illustrates reference lines and reference points determined in the method in FIG. 9 for a human body, according to an embodiment.

Turning ahead in the drawings, FIGS. 9-10 illustrate a flow chart for a method 900 and various reference lines and reference points used in method 900 for generating an upper body polygon mask of the one or more polygon masks for a human body in an image, according to an embodiment. Method 900 can determine the upper body polygon mask based on the activities, parameters, reference lines, reference points, and/or geometric formulas in a configuration set retrieved from a memory device or database (e.g., memory device/database 3123 (FIG. 3), remote database 320 (FIG. 3), etc.). In many embodiments, method 900 can be implemented via execution of computing instructions on one or more processors, and can be part of block 400 (FIG. 4) in method 400 (FIG. 4).

Method 900 is merely exemplary and is not limited to the embodiments presented herein. Method 900 can be employed in many different embodiments or examples not specifically depicted or described herein. In some embodiments, the procedures, the processes, the activities, and/or the blocks of method 900 can be performed in the order presented. In other embodiments, the procedures, the processes, the activities, and/or the blocks of method 900 can be performed in any suitable order. In still other embodiments, one or more of the procedures, the processes, the activities, and/or the blocks of method 900 can be combined or skipped. Some or all of the procedures, the processes, the activities, and/or the blocks of method 900 can be performed in real-time.

In many embodiments, system 300 (FIG. 3), system 310 (FIG. 3), user device 3110 (FIG. 3), and/or back-end system 3120 (FIG. 3), can be suitable to perform method 900 and/or one or more of the activities of method 900. In these or other embodiments, one or more of the activities of method 900 can be implemented as one or more computing instructions configured to run at one or more processors and configured to be stored at one or more non-transitory computer readable media. Such non-transitory computer readable media can be part of a computer system such as system 300 (FIG. 3), system 310 (FIG. 3), user device 3110 (FIG. 3), and/or back-end system 3120 (FIG. 3). The processor(s) can be similar or identical to the processor(s) described above with respect to computer system 100 (FIG. 1). In some embodiments, method 900 can be similar or identical to one or more of the activities of blocks 440 and/or 4420 (FIG. 4). Further, the one or more of the activities of method 900 can be performed after activities similar or identical to blocks 410, 420, 430, and/or 4410 (FIG. 4). For examples, the shoulder joints (1011 ($S_r$) and 1012 ($S_l$)), the elbow joints (1013 ($E_r$) and 1014 ($E_l$)), and the hip joints (1015 ($H_r$) and 1016 ($H_l$)) can be determined before method 900 is performed.

In many embodiments, method 900 can include determining the first reference points (1017 ($W_r$) and 1018 ($W_l$)) on the first reference lines ($S_rH_r$ and $S_lH_l$) (block 910). Block 910 can determine the first reference lines ($S_rH_r$ and $S_lH_l$) and the first reference points (1017 ($W_r$) and 1018 ($W_l$)) based on a configuration set for the polygon mask(s). The configuration set can include the joint landmarks, one or more reference points, one or more reference lines (or line segments), and/or one or more geometric formulas. For example, the first reference lines ($S_rH_r$ and $S_lH_l$), as defined in the configuration set, can connect the shoulder joints (1011 ($S_r$) and 1012 ($S_l$)) with the hip joints (1015 ($H_r$) and 1016 ($H_l$)) of a user upper body respectively. The first reference points (1017 ($W_r$) and 1018 ($W_l$)) can be determined to be located at the points on the first reference lines ($S_rH_r$ and $S_lH_l$) from which the respective lengths to the shoulder joints (1011 ($S_r$) and 1012 ($S_l$)) (hereinafter, Length ($S_rW_r$) and Length($S_lW_l$)) are equal to the respective distances between the first shoulder joints to the elbow joints (hereinafter, Length($S_rE_r$) and Length($S_lE_l$)) (see an image 1010 of an example 1000 in FIG. 10).

In some embodiments, method 900 further can include determining the second reference points ($R_x$ and $L_y$) by dividing the second reference lines $S_rW_r$ and $S_lW_l$ respectively into a predetermined segment count (SC) of segments of an equal length (block 920). The second reference lines ($S_rW_r$ and $S_lW_l$), second reference points ($R_i$ and $L_j$, $0 \le i$, $j \le SC$), and SC can be defined in the configuration set. As shown in example 1000 in an image 1020 in FIG. 10, when SC is 5, $S_rW_r$ and $S_lW_l$ are each divided into five segments of equal length (while the respective segment length on $S_rW_r$ and $S_lW_l$ can be different), and the five respective segments of $S_rW_r$ and $S_lW_l$ are each separated by four of the second reference points ($R_{10\_1}$, $R_{10\_2}$, $R_{10\_3}$, $R_{10\_4}$, $L_{10\_1}$, $L_{10\_2}$, $L_{10\_3}$, and $L_{10\_4}$).

In a number of embodiments, method 900 further can include determining the upper body polygon mask (block 930). Block 930 can determine the upper body polygon mask based on the parameters and/or the geometric formula(s) in the configuration set. In a few embodiments, block 930 further can include determining the third reference lines ($R_{SI}L_{SC-SI}$ and $L_{SI}R_{SC-SI}$, SI is a predetermined segment index) that connect the second reference points on the opposing second reference lines (between $R_{SI}$ and $L_{SC-SI}$ and between $L_{SI}$ and $R_{SC-SI}$) (block 9310). In example 1000 shown in an image 1030 in FIG. 10, when SC is 5 and SI is 1 in the configuration set, the third reference lines are formed between $R_{10\_1}$ and $L_{10\_4}$ and between $L_{10\_1}$ and $R_{10\_4}$ respectively. In a few embodiments, the upper body polygon mask can include the two areas (e.g., triangles) 1050 bounded by the reference lines $R_{10\_1}$, $R_{10\_4}$, $R_{10\_1}$, $L_{10\_4}$, $L_{10\_1}$, $L_{10\_4}$, and $L_{10\_1}R_{10\_4}$, and blocks 9320 and 9330 can be skipped.

In some embodiments, block 930 additionally can include determining the side reference curves ($R_{SI}R_{SC-SI}$ & $L_{SI}L_{SC-SI}$) that connect points on the same second reference lines and curve to the right and left sides respectively (block 9320). The side reference curves can be defined by the curve segment formula(s) in the configuration set. As shown in example 1000 in an image 1040, the side reference curves can be any suitable parametric curves, such as Bézier curves that each connect two of the second reference points ($R_{10\_1}$ and $R_{10\_4}$; $L_{10\_1}$ and $L_{10\_4}$) and curve to the right/left sides based on one or more respective control points (e.g., $C_r$ and $C_l$). In the example in image 1040, the control points are the midpoints on the reference lines between the shoulder joints and the elbow joints ($S_rE_r$ and $S_lE_l$).

In a number of example, block 930 further can include determining the upper body polygon mask as the regions bounded by the third reference lines ($R_{SI}L_{SC-SI}$ & $L_{SI}R_{SC-SI}$), as determined in block 9310, and the side reference lines ($R_{SI}R_{SC-SI}$ & $L_{SI}L_{SC-SI}$), as determined in block 9320 (block 9330). For example, in image 1040, the upper body polygon mask can include the regions 1060 bounded by the third reference lines ($R_{10\_1}L_{10\_4}$ & $L_{10\_1}R_{10\_4}$) and the side reference lines ($R_{SI}R_{SC-SI}$ & $L_{SI}L_{SC-SI}$).

Turning ahead in the drawings, FIGS. 11-12 illustrate a flow chart for a method 1100 and various reference lines and reference points used in method 1100 for determining a lower body polygon mask of the one or more polygon masks for a human body in an image, according to an embodiment. Method 1100 can determine the lower body polygon mask based on the activities, parameters, reference lines, reference points, and/or geometric formulas in a configuration set retrieved from a memory device or database (e.g., memory device/database 3123 (FIG. 3), remote database 320 (FIG. 3), etc.). In many embodiments, method 1100 can be implemented via execution of computing instructions on one or more processors, and can be part of block 400 (FIG. 4) in method 400 (FIG. 4).

Method 1100 is merely exemplary and is not limited to the embodiments presented herein. Method 1100 can be employed in many different embodiments or examples not specifically depicted or described herein. In some embodiments, the procedures, the processes, the activities, and/or the blocks of method 1100 can be performed in the order presented. In other embodiments, the procedures, the processes, the activities, and/or the blocks of method 1100 can be performed in any suitable order. In still other embodiments, one or more of the procedures, the processes, the activities, and/or the blocks of method 1100 can be combined or skipped. Some or all of the procedures, the processes, the activities, and/or the blocks of method 1100 can be performed in real-time.

In many embodiments, system 300 (FIG. 3), system 310 (FIG. 3), user device 3110 (FIG. 3), and/or back-end system 3120 (FIG. 3), can be suitable to perform method 1100 and/or one or more of the activities of method 1100. In some embodiments, method 1100 can be similar or identical to one or more of the activities of blocks 440 and/or 4420 (FIG. 4). In these or other embodiments, one or more of the activities of method 1100 can be implemented as one or more computing instructions configured to run at one or more processors and configured to be stored at one or more non-transitory computer readable media. Such non-transitory computer readable media can be part of a computer system such as system 300 (FIG. 3), system 310 (FIG. 3), user device 3110 (FIG. 3), and/or back-end system 3120 (FIG. 3). The processor(s) can be similar or identical to the processor(s) described above with respect to computer system 100 (FIG. 1). Further, the one or more of the activities of method 1100 can be performed after activities similar or identical to blocks 410, 420, 430, and/or 4410 (FIG. 4). For examples, the hip joints (1211 ($H_r$) and 1212 ($H_l$)) and the knee joints (1213 ($K_r$) and 1214 ($K_l$)) can be determined before method 1100 is performed.

In a number of embodiments, method 1100 can include determining the first reference lines ($H_rK_r$ and $H_lK_l$) that connect the hip joints ($H_r$ and $H_l$) with the knee joints ($K_r$ and $K_l$) of a user lower body respectively (block 1110). The first reference lines ($H_rK_r$ and $H_lK_l$) can be defined in a configuration set. Method 1100 further can include determining the first reference points ($R_x$ and $L_y$) by dividing the first reference lines ($H_rK_r$ & $H_lK_l$) respectively into a predetermined segment count (SC) of segments of an equal length (while the respective segment length on $H_rK_r$ and $H_lK_l$ can be different) (block 1120). The first reference points ($R_i$ and $L_j$, $0 \le i$, $j \le SC$) and SC also can be defined in the configuration set. As shown in an example 1200 in an image 1210 in FIG. 12, when SC is 5, the first reference lines ($H_rK_r$ and $H_lK_l$) connect the hip joints (1211 ($H_r$) and 1212 ($H_l$)) with the knee joints (1213 ($K_r$) and 1214 ($K_l$)), $H_rK_r$ and $H_lK_l$ are each divided into five segments of equal length, and the five respective segments of $H_rK_r$ and $H_lK_l$ are each separated by four of the second reference points ($R_{12\_1}$, $R_{12\_2}$, $R_{12\_3}$, $R_{12\_4}$, $L_{12\_1}$, $L_{12\_2}$, $L_{12\_3}$, and $L_{12\_4}$).

In a number of embodiments, method 1100 further can include determining the second reference points ($M_r$ and $M_l$) (block 1130). For example, in an image 1220 for example 1200, the second reference points ($M_r$ and $M_l$) can be the respective midpoints of the first reference lines ($H_rK_r$ and $H_lK_l$), as defined in the configuration set. Further, method 1100 can include determining the third reference point (O) as the point of intersection of the second reference lines ($R_{SI}M_l$ & $L_{SI}M_r$), determined based on the segment index (SI) defined the configuration set and the second reference points ($M_r$ and $M_l$) as determined in block 1130 (block 1140). In example 1200, as shown in an image 1220, SI is 1, the second reference lines connect $R_{12\_1}$ with $M_l$ and $L_{12\_1}$ with $M_r$ respectively, and the third reference point (1215 (O)) can be determined as the point of intersection of the second reference lines ($R_{12\_1}M_l$ & $L_{12\_1}M_r$).

In some embodiments, method 1100 further can include determining the third reference line ($H_rH_l$) that connects the hip joints ($H_r$ & $H_l$) (block 1150). In many embodiments, method 1100 additionally can include determining the lower body polygon mask as the region bounded by the one or more respective segments of the first reference lines ($H_rR_{SI}$ and $H_lL_{SI}$), the segments of the second reference lines ($R_{SI}O$ and $L_{SI}O$), and the third reference line ($H_rH_l$) (block 1160). For example, in an image 1230 of example 1200 where SI is 1, the region (1216) (e.g., a pentagon) bounded by the top segments of the first reference lines ($H_rR_{12\_1}$ and $H_lL_{12\_1}$), the segments of the second reference lines ($R_{12\_1}O$ and $L_{12\_1}O$), and the third reference line ($H_rH_l$) can be the lower body polygon mask.

Various embodiments can include a system for detecting and redacting unwanted content (e.g., nudity) of images featuring human bodies (e.g., a user body of a user). The system can include one or more processors and one or more non-transitory computer-readable media storing computing instructions that, when executed on the one or more processors, cause the one or more processors to perform various acts. In many embodiments, the acts can include capturing, via a camera, an image for upload to a memory device or database (e.g., memory device/database 3123 (FIG. 3), remote database 320 (FIG. 3), etc.). The image can feature a user body of the user or the body of another person.

In many embodiments, the acts further can include determining, by the one or more processors, a polygon mask layer having one or more polygon masks (e.g., an upper body polygon mask and a lower body polygon mask, etc.) for the user body in the image. The act of determining the polygon mask layer can include determining, via a body pose landmarking algorithm, key joint points for the user body in the image based on joint landmarks defined in a configuration set. The body pose landmarking algorithm can include a machine learning model and be pre-trained and/or re-trained iteratively. In a number of embodiments, the act of determining the polygon mask layer further can include determining the one or more polygon masks based on the key joint points and one or more regions of interest defined in the configuration set.

In some embodiments, the configuration set further can include one or more geometric formulas configured to define the one or more regions of interest. The configuration set also can include one or more activities, parameters, etc. The one or more geometric formulas can be associated with the joint landmarks and one or more reference points. In a few embodiments, the one or more geometric formulas can include: (a) one or more line segment formulas associated with one or more first pairs of the joint landmarks and the one or more reference points; and/or (b) one or more curve segment formulas associated with one or more second pairs of the joint landmarks and the one or more reference points.

In some embodiments, the acts further can include before determining the polygon mask layer, training the body pose landmarking algorithm to determine body joint landmarks for a human body based on body poses in a first training image dataset and respective landmarks for each of the body poses. In certain embodiments, the acts additionally can include receiving, via a computer network, the configuration set from a remote database (e.g., memory device/database 3123 (FIG. 3), remote database 320 (FIG. 3), etc.). In a few embodiments where the configuration set includes one or more requirements about the image (e.g., for virtually fitting room or user identification verification, etc.), the acts also can include before determining the polygon mask layer, ensuring that the image satisfies the one or more requirements, such as verifying, via the body pose landmarking algorithm, as trained, that a user body pose for the user body in the image corresponds (e.g., 70% or 75% matching) to a predetermined pose in the configuration set.

In many embodiments, the acts further can include determining, by the one or more processors, a skin mask layer with a skin mask for the image. The skin mask can indicate where the skin of the user body is shown in the image and can include a single skin segment (if the entire user body shown is naked) or one or more skin segments (when at least a portion of the user body is covered). The skin mask can determined based on a respective color of pixels of the image. In certain embodiments, the act of determining the skin mask layer with the skin mask can include comparing the respective color of each pixel of the image with a skin color distribution diagram. In a few embodiments, the act of determining the skin mask layer with the skin mask does not compare every pixel in the image. For example, the act of determining the skin mask layer with the skin mask can include sampling the respective color of a representative pixel from pixel blocks (e.g., 4×4 pixels, 6×6 pixels, etc.) of the image for color comparison.

In some embodiments, the act of determining the skin mask layer further can include determining, via a skin segmentation algorithm, a respective binary value for each pixel of the image based on the respective color for the each pixel. The skin mask layer can be pre-trained and/or re-trained iteratively. In a few embodiments, the acts further can include before determining the skin mask layer, training the skin segmentation algorithm to determine whether an image pixel is categorized as a skin pixel based on human-skin pixels and non-human-skin pixels of training images in a second training image dataset. The second training image dataset can be stored at a database (e.g., memory device/database 3123 (FIG. 3), remote database 320 (FIG. 3), etc.).

In many embodiments, the acts further can include blending the one or more polygon masks and the skin mask into a final mask layer comprising a final mask for the image. In embodiments where the polygon mask layer and the skin mask layer comprise binary values for pixels of an image, the act of blending the one or more polygon masks and the skin mask into the final mask layer can include performing a bitwise operation (e.g., AND or XOR) on the polygon mask layer and the skin mask layer.

In many embodiments, the acts further can include applying the final mask to the image. The act of applying the final mask to the image can include overlaying the final mask layer onto the image to cover a portion of the user body in the image by the final mask. In certain embodiments, the act of overlaying the final mask layer onto the image further can include applying a mask style (e.g., a color, a pattern, etc.) to the final mask; and overlaying the final mask layer, with the mask style applied to the final mask, onto the image.

Various embodiments also can include a method for detecting and redacting unwanted content of images featuring human bodies. The method can be implemented via execution of computing instructions configured to run at one or more processors and stored at one or more non-transitory computer-readable media. The method can include one or more activities of the system and/or method described above.

In many embodiments, the method can include capturing, via a camera, an image for upload, wherein the image features a user body of a user. The method further can include determining, by the one or more processors, a polygon mask layer having one or more polygon masks for the user body in the image. Determining the polygon mask layer can include: (a) determining, via a body pose landmarking algorithm, key joint points for the user body in the image based on joint landmarks defined in a configuration set; and (b) determining the one or more polygon masks based on the key joint points and one or more regions of interest defined in the configuration set.

In many embodiments, the method further can include determining, by the one or more processors, a skin mask layer with a skin mask for the image, wherein the skin mask is determined based on a respective color of pixels of the image. The method additionally can include blending the one or more polygon masks and the skin mask into a final mask layer comprising a final mask for the image. In a number of embodiments, the method further can include applying the final mask to the image.

In many embodiments, the techniques described herein can provide a practical application and several technological improvements. The techniques described herein can provide technological improvements to nudity or porn detection based on configurations adaptable according to the culture and/or target audience. Further, the techniques disclosed here can provide simplified nudity detection and redaction approaches necessary for various online applications, such as virtual apparel fitting for online retail websites, image sharing on social media platforms, image backup on cloud storages, etc. These techniques described herein can provide a significant improvement over conventional approaches that use a single mask to detect nudity and thus generally do not generate accurate or satisfying results.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although detecting inappropriate content in images and redacting the images to cover up the inappropriate content have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-12 may be modified, and that the foregoing discussion of certain of these embodiments does not necessarily represent a complete description of all possible embodiments. Different functions, parameters, and/or machine learning algorithms may be used to determine pose landmarks, detect skin segments, blend the different masks, and/or apply the masks onto problematic images for redacting the unwanted portions of the images. Various training image datasets can be used for training the machine learning algorithms described above.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when run on the one or more processors, cause the one or more processors to perform:

capturing, via a camera, an image for upload, wherein the image features a user body of a user;
determining, by the one or more processors, a polygon mask layer having one or more polygon masks for the user body in the image, comprising:
determining, via a body pose landmarking algorithm, key joint points for the user body in the image based on joint landmarks defined in a configuration set; and
determining the one or more polygon masks based on the key joint points and one or more regions of interest defined in the configuration set;
determining, by the one or more processors, a skin mask layer with a skin mask for the image, wherein the skin mask is determined based on a respective color of pixels of the image;
blending the one or more polygon masks and the skin mask into a final mask layer comprising a final mask for the image; and
applying the final mask to the image.

2. The system in claim 1, wherein the computing instructions, when run on the one or more processors, further cause the one or more processors to perform:
before determining the polygon mask layer, one or more of:
training the body pose landmarking algorithm to determine body joint landmarks for a human body based on body poses in a first training image dataset and respective landmarks for each of the body poses;
verifying, via the body pose landmarking algorithm, as trained, that a user body pose for the user body in the image corresponds to a predetermined pose in the configuration set; or
receiving, via a computer network, the configuration set from a remote database.

3. The system in claim 1, wherein the joint landmarks defined in the configuration set comprise upper body joint landmarks and lower body joint landmarks.

4. The system in claim 1, wherein:
the configuration set further comprises one or more geometric formulas configured to define the one or more regions of interest; and
the one or more geometric formulas are associated with the joint landmarks and one or more reference points.

5. The system in claim 4, wherein:
the one or more geometric formulas include one or more of:
one or more line segment formulas associated with one or more first pairs of the joint landmarks and the one or more reference points; or
one or more curve segment formulas associated with one or more second pairs of the joint landmarks and the one or more reference points.

6. The system in claim 1, wherein determining the skin mask layer further comprises:
determining, via a skin segmentation algorithm, a respective binary value for each pixel of the image based on the respective color for the each pixel.

7. The system in claim 6, wherein the computing instructions, when run on the one or more processors, further cause the one or more processors to perform:
before determining the skin mask layer, training the skin segmentation algorithm to determine whether an image pixel is categorized as a skin pixel based on human-skin pixels and non-human-skin pixels of training images in a second training image dataset.

8. The system in claim 1, wherein:

blending the one or more polygon masks and the skin mask into the final mask layer comprises performing a bitwise operation on the polygon mask layer and the skin mask layer.

9. The system in claim 1, wherein applying the final mask to the image further comprises:

overlaying the final mask layer onto the image to cover a portion of the user body in the image by the final mask.

10. The system in claim 9, wherein overlaying the final mask layer onto the image further comprises:

applying a mask style to the final mask; and overlaying the final mask layer, with the mask style applied to the final mask, onto the image.

11. A method being implemented via execution of computing instructions configured to run at one or more processors and stored at one or more non-transitory computer-readable media, the method comprising: capturing, via a camera, an image for upload, wherein the image features a user body of a user;

determining, by the one or more processors, a polygon mask layer having one or more polygon masks for the user body in the image, comprising:

determining, via a body pose landmarking algorithm, key joint points for the user body in the image based on joint landmarks defined in a configuration set; and determining the one or more polygon masks based on the key joint points and one or more regions of interest defined in the configuration set;

determining, by the one or more processors, a skin mask layer with a skin mask for the image, wherein the skin mask is determined based on a respective color of pixels of the image;

blending the one or more polygon masks and the skin mask into a final mask layer comprising a final mask for the image; and applying the final mask to the image.

12. The method in claim 11 further comprising:

before determining the polygon mask layer, one or more of:

training the body pose landmarking algorithm to determine body joint landmarks for a human body based on body poses in a first training image dataset and respective landmarks for each of the body poses;

verifying, via the body pose landmarking algorithm, as trained, that a user body pose for the user body in the image corresponds to a predetermined pose in the configuration set; or receiving, via a computer network, the configuration set from a remote database.

13. The method in claim 11, wherein the joint landmarks defined in the configuration set comprise upper body joint landmarks and lower body joint landmarks.

14. The method in claim 11, wherein:

the configuration set further comprises one or more geometric formulas configured to define the one or more regions of interest; and the one or more geometric formulas are associated with the joint landmarks and one or more reference points.

15. The method in claim 14, wherein:

the one or more geometric formulas include one or more of:

one or more line segment formulas associated with one or more first pairs of the joint landmarks and the one or more reference points; or one or more curve segment formulas associated with one or more second pairs of the joint landmarks and the one or more reference points.

16. The method in claim 11, wherein determining the skin mask layer further comprises:

determining, via a skin segmentation algorithm, a respective binary value for each pixel of the image based on the respective color for the each pixel.

17. The method in claim 16 further comprising:

before determining the skin mask layer, training the skin segmentation algorithm to determine whether an image pixel is categorized as a skin pixel based on human-skin pixels and non-human-skin pixels of training images in a second training image dataset.

18. The method in claim 11, wherein:

blending the one or more polygon masks and the skin mask into the final mask layer comprises performing a bitwise operation on the polygon mask layer and the skin mask layer.

19. The method in claim 11, wherein applying the final mask to the image further comprises:

overlaying the final mask layer onto the image to cover a portion of the user body in the image by the final mask.

20. The method in claim 19, wherein overlaying the final mask layer onto the image further comprises:

applying a mask style to the final mask; and overlaying the final mask layer, with the mask style applied to the final mask, onto the image.

\* \* \* \* \*